United States Patent [19]

Gautier

[11] Patent Number: 5,141,179
[45] Date of Patent: Aug. 25, 1992

[54] RESERVOIR FOR AIRCRAFT

[75] Inventor: Lucien F. Gautier, Marseilles, France

[73] Assignee: Societe Nationale Industrielle et Aerospatiale, Paris, France

[21] Appl. No.: 671,447

[22] Filed: Mar. 19, 1991

[30] Foreign Application Priority Data

Mar. 27, 1990 [FR] France .................. 90 03899

[51] Int. Cl.⁵ ........................................... B64D 37/08
[52] U.S. Cl. .............................. 244/135 R; 137/38; 137/574; 220/563
[58] Field of Search ............ 184/6.2; 137/38, 574; 244/53 R, 135 R; 220/4.14, 4.16, 563

[56] References Cited

U.S. PATENT DOCUMENTS

| | | | |
|---|---|---|---|
| 2,338,450 | 1/1944 | Martin | 158/16 |
| 2,731,938 | 1/1956 | Eagon | 116/118 |
| 2,806,622 | 9/1957 | Leirer | 220/4.14 |
| 2,982,374 | 5/1961 | Hughes et al. | 183/2.5 |
| 3,049,138 | 8/1962 | Klank, Jr. | 137/38 |
| 3,882,815 | 5/1975 | Bennett | 115/70 |
| 4,141,311 | 2/1979 | Taylor | 116/227 |
| 4,210,176 | 7/1980 | Emming | 137/573 |
| 4,287,913 | 9/1981 | Bennett et al. | 137/576 |

FOREIGN PATENT DOCUMENTS

| | | |
|---|---|---|
| 896598 | 11/1953 | Fed. Rep. of Germany . |
| 6443/1912 | of 1912 | United Kingdom . |
| 2059372 | 4/1981 | United Kingdom . |

*Primary Examiner*—Charles A. Marmor
*Assistant Examiner*—Carla Mattix
*Attorney, Agent, or Firm*—Fisher, Christen & Sabol

[57] ABSTRACT

A reservoir for aircraft, such as a helicopter, containing a fluid and having at least orifices in its side wall close to its bottom and to which a fluid feed and return ducts can be connected. The reservoir has to allow the aircraft to effect temporary flight phases under negative load factor, a plate having a passage, for retarding the movement of the fluid contained in the reservoir, so that the fluid, moving from the bottom to the top of the reservoir during the temporary flight phases and passing through the passage of the retarding means, remains in communication with the orifice for the duration of the flight phases, while avoiding the entry of air into the duct.

18 Claims, 3 Drawing Sheets

RESERVOIR FOR AIRCRAFT

BACKGROUND OF THE INVENTION

1. Field of the Invention

The present invention relates to a reservoir for aircraft, of the type containing a fluid such as oil.

Although not exclusively, reservoir according to the invention is more particularly intended to be installed in helicopters for fitting in the fluid circuit, for example the hydraulic circuit, of the helicopter.

Generally, these reservoirs are of the vented type and are provided with orifices to which in particular the fluid feed and return ducts are connected which open into the fluid contained in the reservoir close to its bottom. These ducts are moreover connected, via pumps and different fluid components, to the servo-controls and to the equipment of the helicopter.

Although such reservoirs give entire satisfaction when the helicopter is flying in usual configurations, on the other hand when it is a question of flight phases with a negative load factor, these reservoirs no longer have a maximum guarantee of operation of the fluid circuit.

Flight phases under negative load factor are temporary flight phases in which the helicopter is subjected to negative accelerations, for example when it is looping, particularly during air fights between helicopters, or when it is subjected to sudden changes of vertical level.

In the first case, since the helicopter is flying temporarily on its back, the fluid contained in the reservoir, then upturned, moves towards the top of the reservoir which corresponds at that moment to the bottom thereof. In the second case the fluid, during the sudden drop of the helicopter, tends to move towards the top of the reservoir.

Whatever the flight phase considered, there is a danger that the feed and return ducts, which open close to the bottom of the reservoir, are no longer immersed in the fluid, which may instantaneously cause draining of the pumps of the hydraulic circuit because of the inlet of air into the ducts, while generating harmful consequences.

Of course, reservoirs may be used such as those fitted on fighter aircraft whose flight phases under negative load factor are frequent and indispensable. However, such reservoirs are pressurized so that they involve a considerable additional weight, as well as a high cost, which are incompatible with helicopters.

2. Description of the Prior Art

From the document DE-C-896 598 an oil reservoir for aircraft is already known which is provided with an orifice disposed close to its bottom and in which a plate is provided separating the reservoir into a lower compartment and an upper compartment and having a passage hole between said compartments. Thus, when the aircraft dives, the movement of the oil between the lower compartment and the upper compartment is braked and said orifice remains covered with oil, so that the air cannot enter through said orifice.

SUMMARY OF THE INVENTION

The object of the present invention is to provide a reservoir of this type, improved so that the aircraft can carry out flight phases under a high negative load factor, with control of the movement of the fluid inside said reservoir.

For this, according to the invention, the reservoir for aircraft, such for example as a helicopter, of the type containing a fluid and having an orifice which is situated close to its bottom and to which a fluid feed or return duct can be connected, said reservoir comprising, to allow said aircraft to effect temporary flight phases under negative load factor, means having a passage, for retarding the movement of the fluid contained in the reservoir, so that the fluid, moving from the bottom to the top of said reservoir during said temporary flight phases while passing through the passage of said retarding means, remains in communication with said orifice for the duration of said flight phases, while avoiding the entry of air into said duct, is remarkable in that the passage formed in said retarding means has a calibrated cross section s satisfying the following formula :

$$s = \frac{S \cdot h}{c \cdot t \sqrt{2 \cdot H \, |ng|}}$$

in which :
- s = total flow section of the fluid provided in the retarding means,
- S = area of the bottom of said reservoir,
- h = height separating the bottom of the reservoir from the orifice,
- H = height of the fluid contained in the reservoir,
- t = duration of the transitory flight phase under negative load factor,
- $|ng|$ = absolute value of the load factor in negative g, g representing the acceleration of gravity and n a negative number, and
- c = coefficient taking into account the friction due to the viscosity of the fluid when passing through said passage.

Thus, when the aircraft is in a flight phase under negative load factor (g negative), the retarding means, while taking into account the parameters relative to the duration of the temporary flight phase, to the value of the negative load factor as well as to the nature of the fluid, prevent the fluid from being transferred rapidly from the bottom to the top of the reservoir, so that, during these short duration flight phases, the fluid feed and return ducts remain constantly immersed in the fluid. Thus, draining of the fluid circuit is avoided.

For a fluid formed by a light mineral oil, the coefficient c may be chosen equal to about 0.62, if the total flow section s is small.

In the case where the fluid retarding means comprise at least one drilled plate connected to said reservoir, said plate separating the reservoir into two respectively lower and upper compartments, said lower compartment, which is situated between the bottom of the reservoir and said plate and in which said orifice is provided, containing the fluid, it is advantageous for several fluid passage holes to be formed in said plate, the sum of the cross sections of which then corresponds to the total flow section s of the fluid. These passage holes may in addition have circular and identical cross sections.

Moreover, said plate is advantageously substantially situated at the level of the fluid contained in the reservoir, parallel to its bottom, and it may be fixed to the side wall of said reservoir.

According to another characteristic of the reservoir, at least one window may be provided in the side wall of the reservoir through which the level of the fluid may be checked. In this case, in order to have faithful reading of the fluid level, which is made inaccurate because of the emulsion and capillarity phenomena generated by the movements of the helicopter, a case is fixed facing said window to the side wall of the reservoir for defining therewith a reduced volume internal to the reservoir, said case being open at its upper end, in communication with the upper compartment, and comprising at least one calibrated passage hole in communication with the fluid contained in the lower compartment of the reservoir.

BRIEF DESCRIPTION OF THE DRAWINGS

The figures of the accompanying drawings will better show how the invention may be put into practice. In these figures, identical references designate similar elements.

DESCRIPTION OF THE PREFERRED EMBODIMENTS

Figure 1:
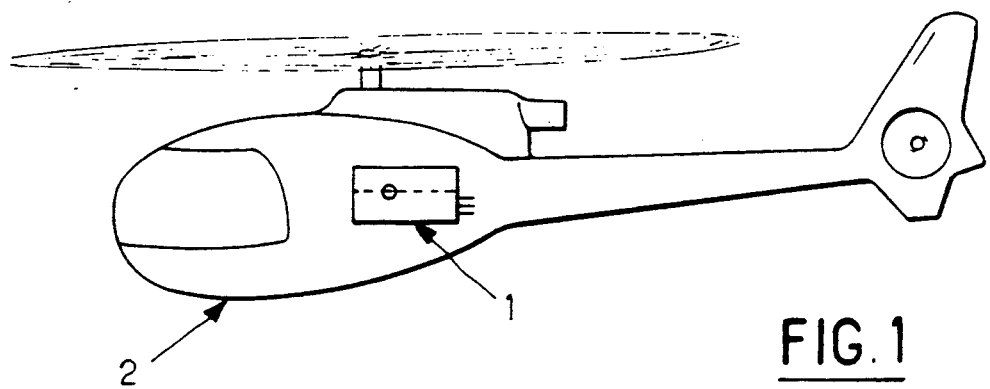
FIG. 1 shows schematically the reservoir according to the invention mounted, in a preferred application, in the hydraulic fluid circuit of a helicopter.

Referring to FIG. 1, reservoir 1 according to the invention is, in this example of application, fitted in a helicopter 2 and it forms part of the hydraulic circuit of the helicopter, for ensuring operation of the servo-controls and equipment, not shown in the Figures but provided in the helicopter.

Figure 2:
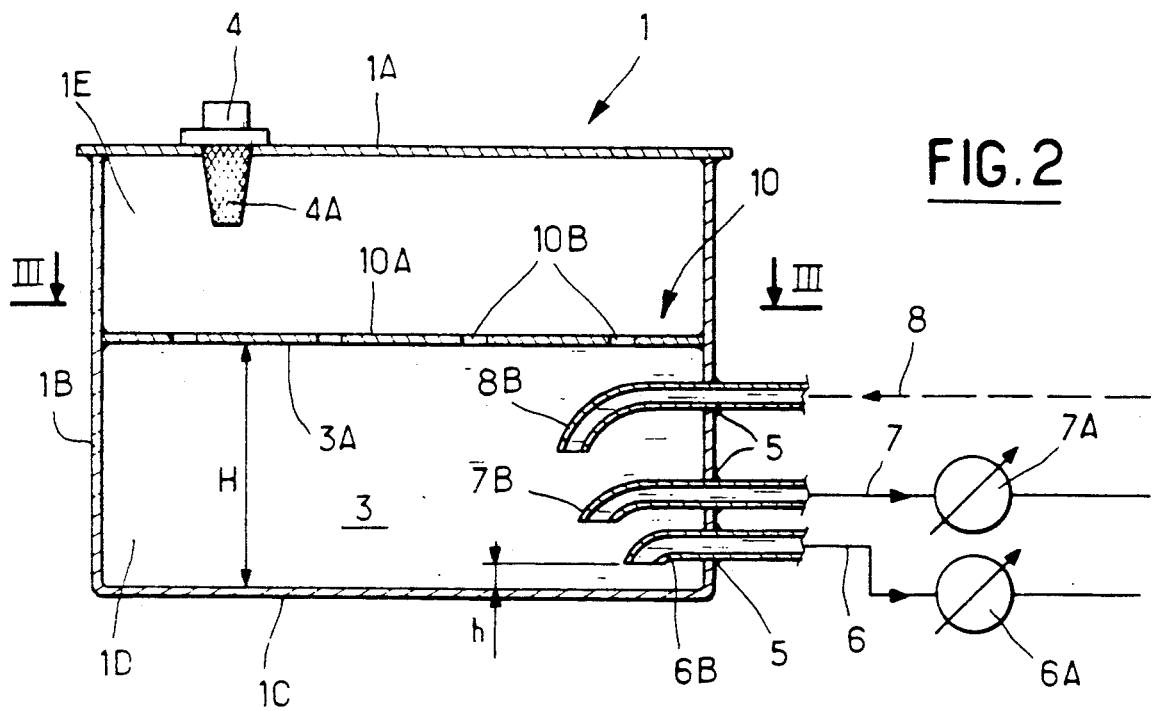
FIG. 2 is an enlarged sectional view of the reservoir according to the invention.

As shown more particularly in FIG. 2, reservoir 1, whose representation is schematized, contains a hydraulic fluid 3 such as oil. Structurally, reservoir 1 is made from welded metal sheet and has in this example a parallelepipedic shape, although any other configuration could be envisaged, as will be seen for example with reference to FIGS. 6 to 8. At the upper part 1A of the reservoir, defining the top thereof, there is provided a plug 4 for filling with oil and having a filter 4A, plug 4 providing as is known venting of the reservoir. The side wall 1B of the reservoir is provided with orifices 5, three of which are shown and to which the corresponding ends of fluid feed and return ducts 6, 7 and 8 of said circuit are connected. The connection of the ducts at the level of the orifices is of course sealed.

More particularly, duct 6 is a suction duct for feeding fluid 3 to the servo-controls of the helicopter via a variable capacity pump 6A. The end 6B of duct 6 opens into the reservoir close to bottom 1C thereof, at a distance h from said bottom. Duct 7 is also a suction duct for feeding fluid to the equipment of the helicopter via a variable capacity pump 7A. The end 7B of duct 7 opening into reservoir 1 is situated above that of duct 6. Finally, duct 8 is a fluid return duct, for return of the fluid from the servo-controls and equipment of the helicopter into reservoir 1. The end 8B of duct 8 opening into reservoir 1 is situated above duct 7.

Other elements or ducts could also be associated with the reservoir.

According to the invention and in this application, so that the helicopter can carry out temporary flight phases under negative load factor, such as defined above, reservoir 1 comprises means 10 for retarding the movement of fluid 3 inside reservoir 1 so that the fluid, moving from the bottom 1C to the top 1A of the reservoir during these temporary flight phases, remains in communication for the duration of the flight phases with the ends of the fluid feed and return ducts of said hydraulic circuit, while avoiding the entry of air therein, which is likely to cause draining of the pumps.

In the embodiment illustrated in FIGS. 2 and 3, the retarding means 10 comprise a plate 10A with a plurality of identical passage holes 10B whose cross section is calibrated as will be seen subsequently. This plate 10A is made preferably from metal and is for example welded to the side wall 1B of reservoir 1. Plate 10A is fixed parallel to bottom 1C of the reservoir and is substantially flush with the level 3A of fluid 3, which is situated at a distance H from the bottom 1C of said reservoir. Thus, plate 10A separates reservoir 1 into two lower 1D and upper 1E compartments, the lower compartment 1D containing fluid 3 whereas the upper compartment 1E contains air.

The passage of fluid 3 from compartment 1D to compartment 1E of the reservoir, during temporary flight phases under negative load factor of said helicopter, must take place appropriately so that the end 6B of the suction duct 6, the closest to the bottom 1C of the reservoir, is always immersed in the fluid 3 so as to avoid the entry of air therein, with the harmful consequences which that may have. Consequently, the volume of fluid able to flow into compartment 1E through the holes 10B of the plate must be less than the volume of the fluid contained in the reservoir, between its bottom 1C and the end 6B of the suction duct 6. To comply with this condition and to take into account the parameters relative to the duration of the temporary flight phase, to the value of the negative load factor and to the nature of the fluid present, the total cross section of the passage holes 10B formed in the plate, from which the flow rate of the fluid passing from one compartment to the other is determined, in accordance with the invention satisfies the following formula :

$$s = \frac{S \cdot h}{c \cdot t \sqrt{2 \cdot H \, |ng|}}$$

in which :
 s = total flow section for the fluid provided in the retarding means,
 S = area of the bottom of said reservoir,
 h = height separating the bottom of the reservoir from the nearest suction duct,
 H = height of the fluid contained in the reservoir,
 t = duration of the transitory flight phase of the helicopter under negative load factor,
 $|ng|$ = absolute value of the load factor in negative g, g representing the acceleration of gravity and n a negative number, and
 c = coefficient taking into account the friction due to the viscosity of the fluid when passing through said passage holes.

In the case where fluid 3 is a light mineral oil (weight per unit of volume about 800 kg/m3), the coefficient c is chosen equal to 0.62.

Figure 4:
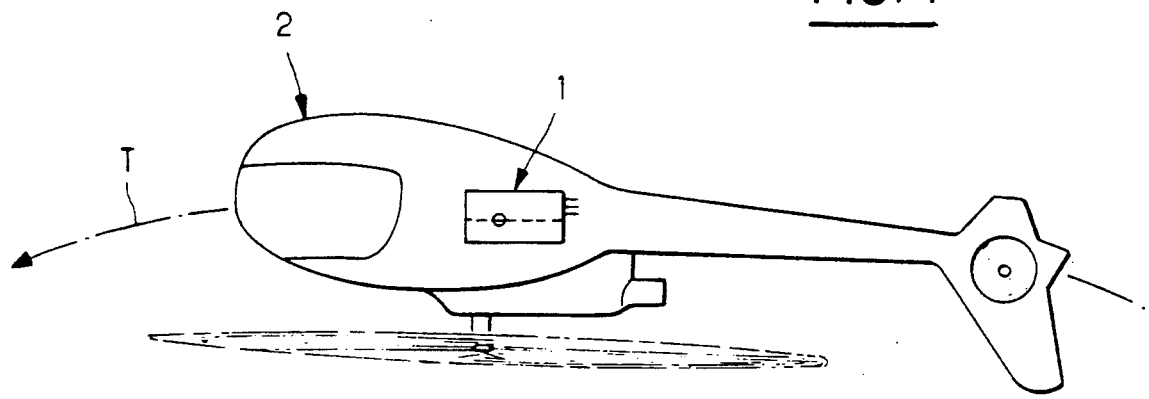
FIG. 4 shows the helicopter during a temporary flight phase under negative load factor.

In FIG. 4 the helicopter 2 has been shown carrying out a temporary flight phase under negative load factor, such as a loop, along path T. In the position illustrated, the helicopter is on its back at the top of the loop.

At this time, a part of the fluid 3 contained in the reservoir, which is then upturned, flows through the calibrated passage holes 10B of plate 10A of compartment 1D towards compartment 1E in the direction of the upper part 1A of the reservoir which then serves as the bottom. Simultaneously, air is introduced through the passage holes 10B into the compartment 1D of the reservoir and flows in the form of bubbles in fluid 3 and forms an air pocket 11 between the bottom 3 of the reservoir, then corresponding to its top and the level of fluid 3.

It can then be seen that this air pocket 11, whose volume corresponds substantially to the volume of the fluid 3B then contained in the compartment 1E of the reservoir, does not reach the level of the end 6B of the suction duct 6, the latter being still immersed in the fluid 3 which remains in the compartment 1D of the reservoir.

Thus, with these retarding means 10 provided in reservoir 1, the helicopter may carry out flight phases under a negative load factor in all safety, it is true only for a relatively short time.

When helicopter 2 finishes its maneuver, the fluid volume 3B returns to compartment 1D, and the air volume 11 returns to compartment 1E of the reservoir, corresponding to FIG. 2.

These calibrated passage holes 10B, necessary for retarding the transfer of fluid from compartment 1D to compartment 1E, also allow the free passage of the fluid when the latter expands because of the temperature. Therefore when the fluid flow return through duct 8 is momentarily greater than the fluid flow sucked through ducts 6 and 7, for example, during operation of the landing gear, the hydraulic fluid may freely pass into compartment 1D through the passage holes.

Moreover, another advantage of plate 10A should be mentioned in that it reduces sloshing of the fluid in the reservoir.

Figure 3:
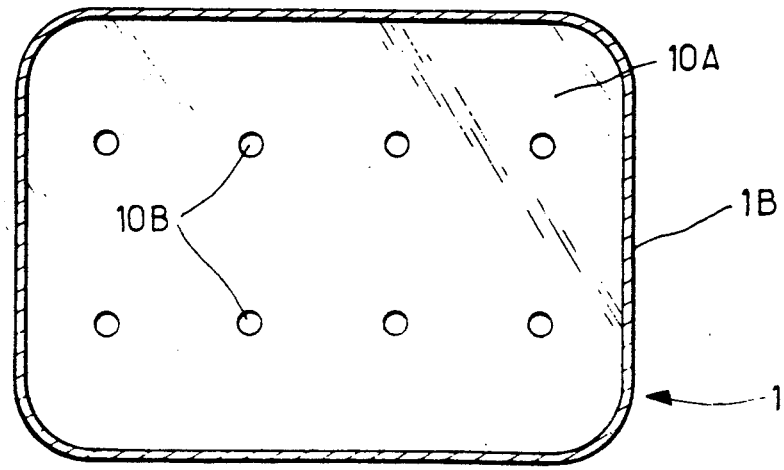
FIG. 3 is a sectional view of the reservoir through line III—III of FIG. 2.
Figure 5:
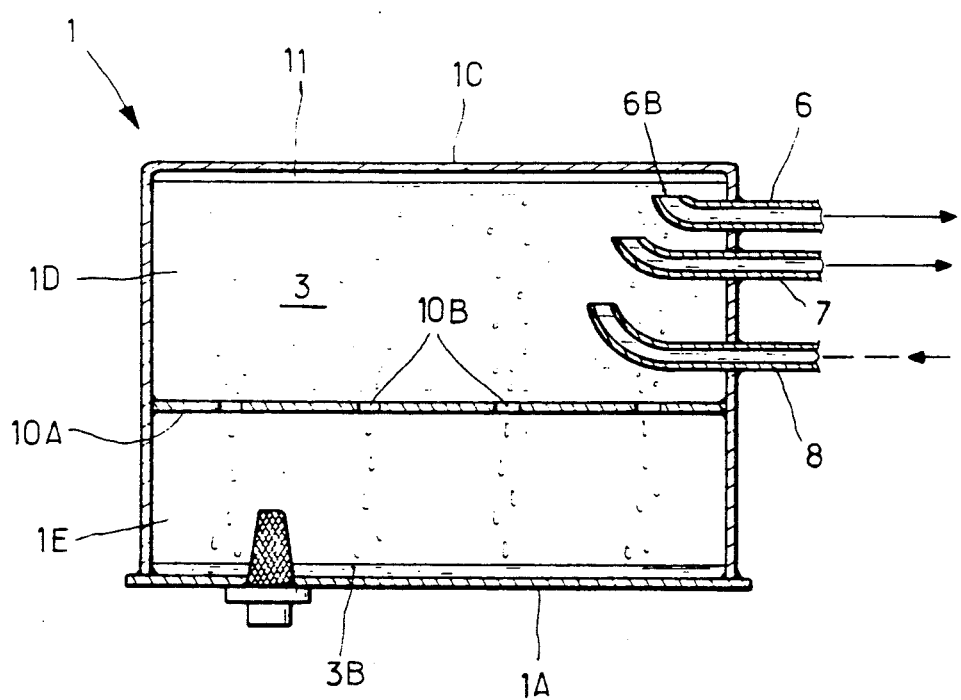
FIG. 5 shows the reservoir during the flight phase of the helicopter, illustrated in FIG. 4, showing the passage of the fluid from one compartment to the other of said reservoir through retarding means.
Figure 6:
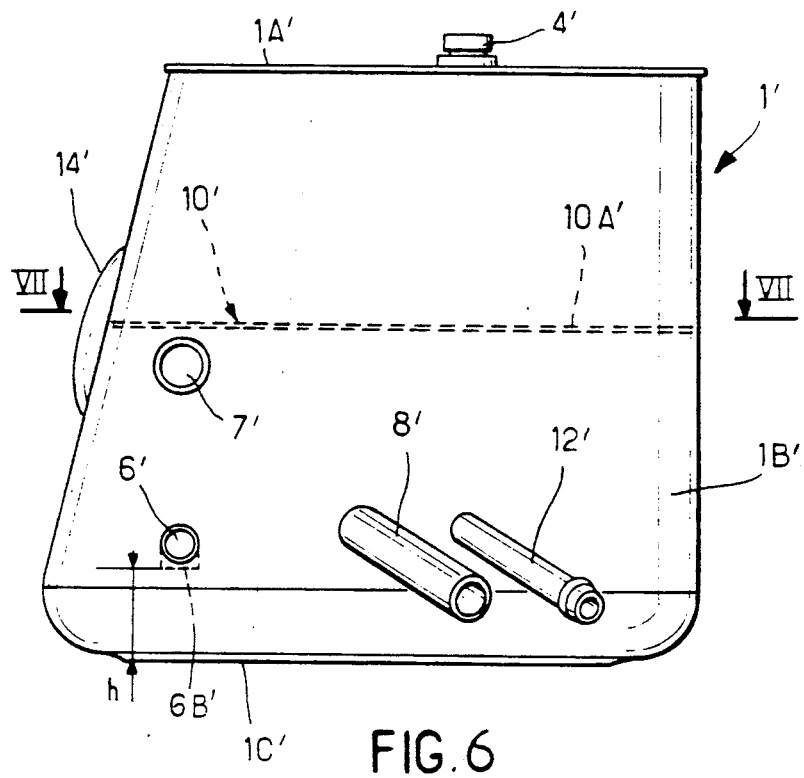
FIG. 6 is an external view of a preferred embodiment of said reservoir according to the invention.
Figure 8:
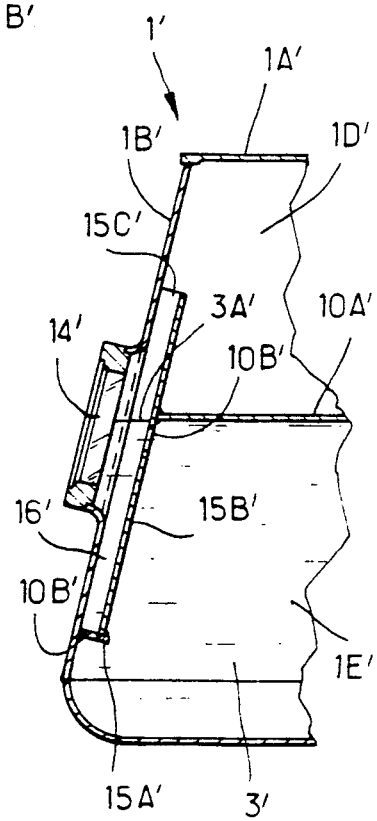
FIG. 8 is a sectional view of the reservoir through line VIII—VIII of FIG. 7.
Figure 7:
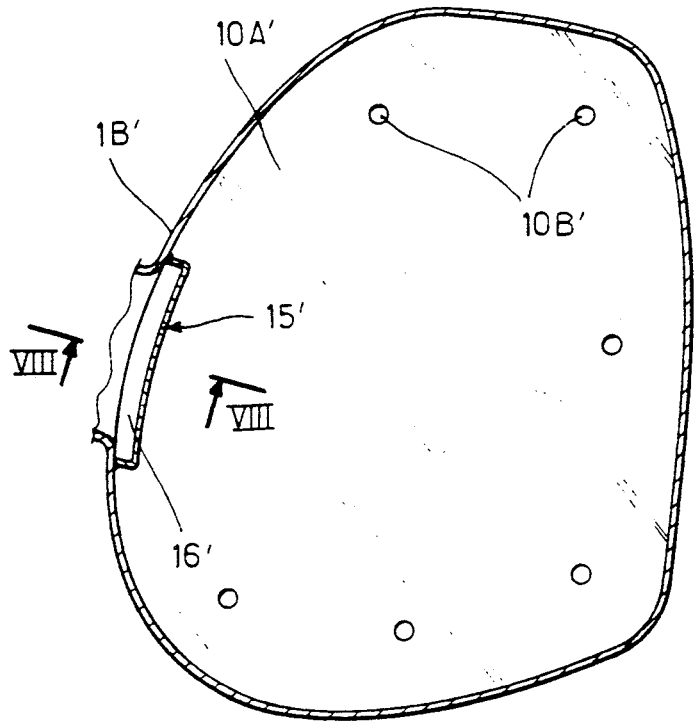
FIG. 7 is a sectional view of the reservoir through line VII—VII of FIG. 6.

In FIGS. 6 to 8 one embodiment of the reservoir according to the invention has been shown for fitting in a helicopter and which is in design and operation similar to the reservoir 1 shown schematically in FIGS. 2, 3 and 5.

This reservoir 1' is thus made from metal sheet and has, as can be seen in FIG. 7, a substantially egg-shaped cross section. On its side wall 1B' are connected the fluid suction ducts 6' and 7' and the fluid return duct 8. The arrival of the end 6B' of the suction duct 6 in compartment 1D' of the reservoir, filled with fluid 3', has been shown with dotted lines as well as the distance h separating the end 6B' of bottom 1C' of the reservoir. The ends of the other ducts open above the end 6B' of duct 6. A closable connection 12' has also been provided for connection to a hydraulic test bench for checking the hydraulic fluid circuit when the helicopter is on the ground, with the pumps stopped.

Furthermore, at the upper part 1A' of reservoir 1', welded to the side wall 1B', there is provided the filling plug 4' with venting.

Plate 10A' of the fluid retarding means 10', which separates reservoir 1' into two compartments 1D' and 1E', is disposed in the same way as before and has in this case six calibrated passage holes 10B'.

Referring more particularly to FIG. 8, a window 14' is in addition provided in the side wall 1B' of reservoir 1', and projects outwardly therefrom. This window 14' is situated in correspondence with the level 3A' of fluid 3' contained in the reservoir, and thus allows it to be checked.

However, because of the emulsion and capillarity phenomena which risk appearing because of the movements of the reservoir, and so as to have an exact indication of the fluid level, a case 15' is provided inside the reservoir formed of metal sheet and welded facing window 14' to the side wall 1B' of the reservoir. This case 15' defines with the corresponding side wall portion a reduced internal volume 16' filled with fluid 3', through two calibrated passage holes 10B' situated respectively in bottom 15A' of the case and in the wall 15B' thereof, to which plate 10A' is partially welded. This hole 10B' is situated just under plate 10A'. Case 15' has an opening 15C' at its upper part and is thus in communication with the upper compartment 1D' of reservoir 1'.

The fluid contained in this reduced volume 16' is thus less subject to emulsion phenomena so that the level 3A' of fluid 3 appearing through the window 14' is relatively accurate.

What is claimed is:

1. Reservoir for aircraft, said reservoir having a top and a bottom and capable of containing a liquid, said reservoir comprising:

at least one orifice situated close to said bottom and connected to a liquid feed duct or return duct;

a plate disposed in said reservoir and separating said reservoir into a lower compartment situated between said bottom and said plate and an upper compartment situated between said plate and said top, said orifice being provided in said lower compartment, and said plate having a liquid passage means between said lower and upper compartments;

said liquid passage having a calibrated cross section s defined by:

$$s = \frac{Sh}{c.t \sqrt{2H|ng|}}$$

in which:

S = area of said bottom;
h = height separating said bottom from said orifice;
H = height of the liquid contained in said reservoir;
t = duration of the temporary flight phase under negative load factor;
|ng| = absolute value of the load factor in negative g, g representing the acceleration of gravity and n a negative number; and
c = coefficient taking into account the friction due to the viscosity of the liquid when passing through said passage;
so that as said aircraft temporary flight phases under negative load factor, movement of liquid from said lower compartment to said upper compartment is delayed in such a way that said duct remains covered by said liquid in said lower compartment, wherein a window is provided in a side wall of the reservoir through which a level of fluid contained in the reservoir may be checked, and wherein a case is fixed, facing said window, to the side wall of the reservoir for defining therewith a reduced volume internal to the reservoir, said case being open at an upper end, in communication with the upper compartment, and comprising at least one calibrated passage hole in communication with liquid contained in the lower compartment of the reservoir.

2. The reservoir as claimed in claim 1, in which said liquid is a light mineral oil, wherein the coefficient c is equal to about 0.062.

3. The reservoir as claimed in claim 1, wherein said plate is substantially situated at a level of the fluid contained in the reservoir, and parallel to said bottom.

4. The reservoir as claimed in claim 1 wherein said plate is fixed to a side wall of said reservoir.

5. A reservoir for receiving a liquid having side walls, a top wall and a bottom wall, at least one liquid feed or liquid return duct in a side wall a disposed in a close spaced relation to said bottom wall, plate means extending between said side walls and substantially parallel to said bottom wall to define an upper compartment between said plate means and said top wall and to define a lower compartment between said plate means and said bottom wall, liquid passage means comprising a plurality of holes in said plate means to control flow of a liquid through said plate means, said liquid passage having a cross section s defined by:

$$s = \frac{S \cdot h}{c \cdot t \sqrt{2 \cdot H_{|ng|}}}$$

wherein:
 S = area of said bottom;
 h = height separating said bottom from said orifice;
 H = height of the liquid contained in said reservoir;
 t = duration of the temporary flight phase under negative load factor;
 |ng| = absolute value of the load factor in negative g, g representing the acceleration of gravity and n a negative number; and
 c = coefficient taking into account the friction due to the viscosity of the liquid when passing through said passage;
whereby under temporary flight phases under negative load factor, liquid in said lower compartment flowing to said upper compartment through said fluid passage means is restricted whereby said duct is covered by said liquid in said lower compartment for a period of time.

6. The reservoir as claimed in claim 5, in which said liquid is a light mineral oil, wherein the coefficient c is equal to about 0.62.

7. The reservoir as claimed in claim 5, wherein said holes have circular and identical cross sections.

8. The reservoir as claimed in claim 5 wherein said plate means is substantially situated at a level of the fluid contained in the reservoir, and parallel to said bottom.

9. The reservoir as claimed in claim 5 wherein said plate means is fixed to a side wall of said reservoir.

10. The reservoir as claimed in claim 5, wherein a window is provided in a side wall of the reservoir through which a level of fluid contained in the reservoir may be checked.

11. The reservoir as claimed in claim 10, wherein a case is fixed, facing said window, to a side wall of the reservoir for defining therewith a reduced volume internal to the reservoir, said case being open at an upper end, in communication with the upper compartment, and comprising at least one calibrated passage hole in communication with liquid contained in the lower compartment of the reservoir.

12. Reservoir for aircraft, said reservoir having a top and a bottom and capable of containing a liquid, said reservoir comprising:
 at least one orifice situated close to said bottom and connected to a liquid feed duct or liquid return duct;
 a plate disposed is said reservoir and separating said reservoir into a lower compartment situated between said bottom and said plate and an upper compartment situated between said plate and said top, said orifice being provided in said lower compartment, and said plate having a liquid passage means between said lower and upper compartments;
 said liquid passage having a calibrated cross section s defined by:

$$S = \frac{Sh}{c.t \sqrt{2H_{|ng|}}}$$

in which:
 S = area of said bottom;
 h = height separating said bottom from said orifice;
 H = height of the liquid contained in said reservoir;
 t = duration of the temporary flight phase under negative load factor;
 |ng| = absolute value of the load factor in negative g, g representing the acceleration of gravity and n a negative number; and
 c = coefficient taking into account the friction due to the viscosity of the liquid when passing through said passage;
 so that as said aircraft effects temporary flight phases under negative load factor, movement of liquid from said lower compartment to said upper compartment is delayed in such a way that said duct remains covered by said liquid in said lower compartment,
wherein said plate has several holes constituting said liquid passage means, the sum of the cross-sections of said holes corresponding to said calibrated cross-section s.

13. The reservoir as claimed in claim 12, in which said liquid is a light mineral oil, wherein the coefficient c is equal to about 0.62.

14. The reservoir as claimed in claim 12, wherein said holes have circular and identical cross sections.

15. The reservoir as claimed in claim 12, wherein said plate is substantially situated at a level of the fluid contained in the reservoir, and parallel to said bottom.

16. The reservoir as claimed in claim 12, wherein said plate is fixed to a side wall of said reservoir.

17. The reservoir as claimed in claim 12, wherein a window is provided in a side wall of the reservoir through which a level of fluid contained in the reservoir may be checked.

18. The reservoir as claimed in claim 17 wherein a case is fixed, facing said window, to the side wall of the reservoir for defining therewith a reduced volume internal to the reservoir, said case being open at an upper end, in communication with the upper compartment, and comprising at least one calibrated passage hole in communication with liquid contained in the lower compartment of the reservoir.

* * * * *